March 8, 1949.　　C. D. PETERSON ET AL　　2,463,714

FLUID SEAL

Filed Oct. 25, 1945

INVENTOR.
CARL D. PETERSON
ALBERT H. DEIMEL
BY Bodell & Thompson
ATTORNEYS

Patented Mar. 8, 1949

2,463,714

UNITED STATES PATENT OFFICE 2,463,714

FLUID SEAL

Carl D. Peterson and Albert H. Deimel, Toledo, Ohio, assignors to Dana Corporation, Toledo, Ohio, a corporation of Virginia Application October 25, 1945, Serial No. 624,524

1 Claim. (Cl. 286—11)

This invention relates to fluid seals for use between two relatively rotatable elements, and particularly seals for hydraulic transmissions, as fluid couplings, hydraulic torque converters, etc.

The invention has for its object a seal which, because of its construction and arrangement, is not only effective or leakproof but also is long-lived or remains effective over a long period and is self-correcting. It also has for its object a seal construction consisting of two main component members, either of which is easily replaceable in the field without requiring special mechanical and technical skill, so that seal replacements may be made successfully by any mechanic competent to work on hydraulic transmissions.

The invention also has for its object a seal embodying no materials or construction which are adversely affected by temperatures produced by use or abuse of hydraulic apparatus or transmissions.

The invention further has for its object a seal which has only one pair of rubbing sealing faces, so that any possible warping or variation in flatness of its sealing face which may occur, due to operation conditions, such as heat, and which might cause some leakage will have a self-correcting effect, as there being only one pair of sealing faces, the faces will wear in or lap in, and thereby correct and improve their flatness and contact against leakage. This is not true of seals where multiple contact or rubbing surfaces are used, particularly where one pair has no rotation relative to the other pair.

The seal is here shown as embodied in a hydraulic or fluid coupling.

The invention consists in the novel features and in the combinations and constructions hereinafter set forth and claimed.

In describing this invention, reference is had to the accompanying drawings in which like characters designate corresponding parts in all the views.

Figure 1:
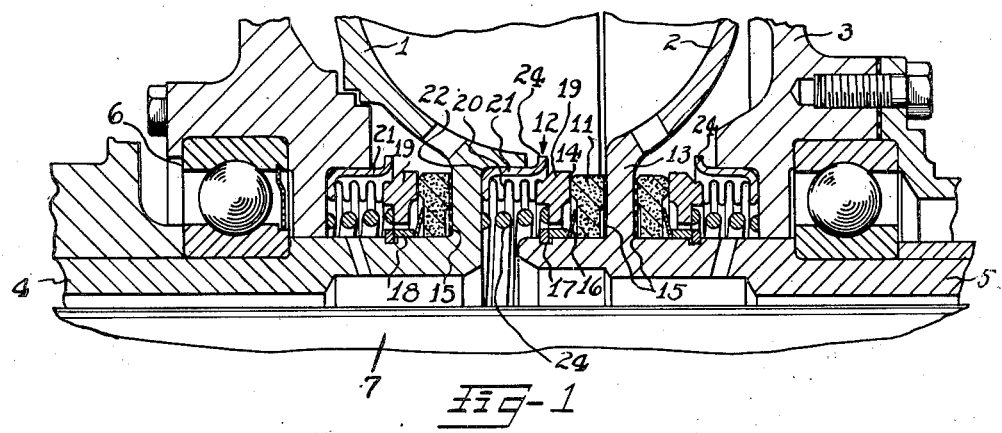
Figure 1 is a longitudinal, axial, fragmentary, sectional view of a hydraulic coupling embodying the seals of this invention.

1 designates the impeller, and 2 the runner of a hydraulic coupling. 3 is the stationary casing enclosing the elements 1, 2. On the impeller 1 and runner 2 are hubs or sleeves 4, 5, respectively, journalled in suitable bearings 6 in the casing 3. The two sleeves 4 and 5 surround a central shaft 7. The construction here shown is part of a hydraulic transmission where there is a drive through the hydraulic coupling, the sleeve 4 being connected to drive shaft 7 actuated by the engine shaft and the sleeve 5 being connected to the driven shaft of the transmission. The transmission, however, forms no part of the invention.

The invention relates to the oil seals for confining the fluid or oil to the coupling or from leakage between the impeller 1 and runner 2 and leakage from within the casing 3. Three oil seals are shown. All of them are alike in construction. The impeller 1 and runner 2 constitute a pair of relatively rotating elements, as do also the impeller 1 and the casing 3, and the runner 2 and the casing 3. The fluid seal includes two members carried by the relatively rotating elements respectively, one of these members consisting of a sealing ring, bellows and a housing therefor. Each of these members is so mounted on the element with which it rotates that it is easily removable and replaceable with accuracy without exceptional skill. One of the members is a unit of a plurality of parts consisting of a friction ring, a bellows, and a housing. It being a unit, it can be readily removed and replaced without exceptional skill, and the sealing rings of both members accurately and efficiently coact.

11 and 12 designate the members as a whole, one of these members, as the member 11, encircling the sleeve 2 adjacent the web 13 of the runner 2, which is provided with a flat surface. This member 11 is of a non-metallic material, as a carbon compound, and has flat faces on its opposite sides normal to the axis of rotation. The face 14 on the outer side is a sealing face. The flat face on the opposite side coacts with the flat face on the web 13 through a flat gasket 15 of compressible or conformable material. The carbon sealing ring of the member 11 is spring-pressed toward the flat face of the web 13 or the interposed gasket 15 by a conoidal spring washer 16, which is held in place by a snap ring seated in a groove in the sleeve 6. The holding force of the snap ring is here shown as transferred to the conoidal washer 16 through a spacer 18.

The unitary member 12 consists of a sealing ring 19, which is usually of steel, having a flat sealing face normal to the axis of rotation for coacting with the sealing face 14 of the carbon sealing ring of the member 11, spring bellows 20 and a casing 21 therefor, the bellows being fixedly secured at its opposite ends to the ring 19 and to the casing 21. The casing 21 has a cylindrical peripheral surface for fitting snugly into a recess 22 in the other of the relatively rotating parts, as the runner 2 or the hub of the casing 3 at 23. The casing is provided with an internal bottom flange to which one end of the bellows is secured, as by soldering, and with an outwardly extending annular flange 24 at its outer end for coacting with a pulling tool, the flange being spaced from the opposing surface of the runner 1 or the casing 3, when the internal bottom flange bottoms in the recess 22. Preferably, a coil spring 25 is utilized to press the ring 19 axially against the sealing surface 14 of the carbon compound ring of the member 11.

Figure 3:
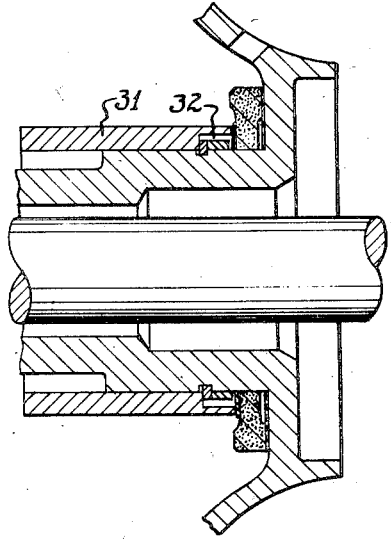
Figure 3 is a fragmentary sectional view, parts being omitted, of parts seen in Figure 1, showing the tool and method of assembling the other of the two members of the seal in position on one of the rotating elements.
Figure 4:
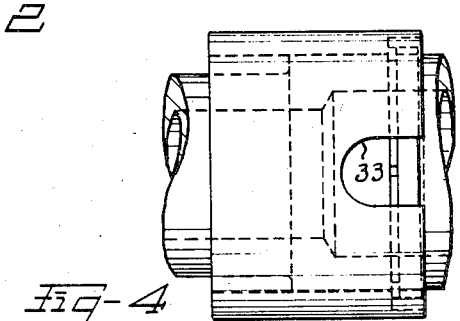
Figure 4 is a detail view of the tool shown in Figure 3.

The parts of the member 11 are assembled and removed by a simple tool here shown as consisting of a sleeve 31 of such diameter as to fit the part on which the member 11 is mounted, and having an internal groove, countersink or rabbet 32 for enclosing the spacer 18 and the snap ring 17. The end of the sleeve 31 is pressed against the conoidal washer to compress it, as shown in Figure 3, until the snap ring alines with its groove in the sleeve 6 or other part on which the carbon sealing ring is mounted. With the snap ring in place, the tool may be removed. The sleeve has a slot 33 which is brought into register with the split in the snap ring when it is desired to remove the snap ring, the slot making the snap ring accessible for prying its ends out of the groove, so that the entire member 11 may be removed from the groove, permitting the member 11 to be demounted.

Figure 2:
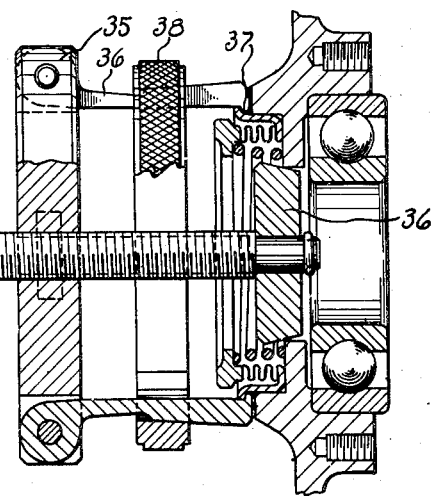
Figure 2 is a fragmentary view of parts seen in Figure 1 and in addition a tool for removing, for the purpose of replacement, one of the two members constituting the seal.

In assembling the unitary member 12, the spring 24 is placed in position within the bellows and the housing 21 pressed into its recess. For the purpose of removing the unit 12 for repair work, a suitable pulling tool is used, this being here shown as consisting of a body 35 having pivoted arms 36 provided with hooks 37 at their ends for hooking over the annular flange 24, and held in this position, as by a cam compressing collar 38, an operating screw 39 threading axially through the body 35 and swivelled in a head 40 which enters the unit 12 through the open bottom of the housing and thrusts against the element on which this unit is mounted, as seen in Figure 2. Now, upon turning the screw 39 with the arms 36 interlocked with the annular flange 24, the housing 21 will be pulled out of its recess, taking the bellows and sealing ring therewith.

As this seal has but one pair of contacting or sealing surfaces rotatable relatively to each other, and as the conoidal spring applies equal pressure throughout its circle to the sealing ring of the member 11, and hence to the gasket 15, the single pair of flat contacting faces will wear or lap in or correct any inequalities therein. Owing to its construction including the unitary construction of the member 12 and to the assembly by the snap ring of the member 11 in position, the members of the seal may be easily removed and accurately replaced by mechanics not having exceptional skill.

What we claim is:

A fluid seal for use between two coaxial, axially-spaced and relatively-rotating elements, one formed with an internal annular recess concentric with the axis of rotation and having a flat bottom face normal to the axis of rotation, and the second element having an annular face spaced from and opposed to the bottom of the recess, the fluid seal being located between said faces, the seal including two members, one having faces normal to the axis of rotation on opposite sides thereof and pressing against the flat face of the second element, the second sealing member including a ring coacting with the first sealing member, a cup-shaped abutment fitting into the recess of the first element and having an internal annular flange against the bottom face thereof, a spring bellows between the internal flange of the cup-shaped member and the second sealing member, and a spring washer on the second element between the sealing members, and thrusting against the first sealing member and located within the circle of the sealing faces of said members.

CARL D. PETERSON.
ALBERT H. DEIMEL.

REFERENCES CITED

The following references are of record in the file of this patent:

UNITED STATES PATENTS

| Number | Name | Date |
|---|---|---|
| 1,972,078 | Eberhard | Sept. 4, 1934 |
| 2,080,403 | Homan | May 18, 1937 |
| 2,151,730 | Basebe et al. | Mar. 28, 1939 |
| 2,189,197 | Cerny | Feb. 6, 1940 |
| 2,334,548 | Greenlee | Nov. 16, 1943 |